US010834803B2

(12) United States Patent
Cho et al.

(10) Patent No.: US 10,834,803 B2
(45) Date of Patent: Nov. 10, 2020

(54) SMART TRIMS FOR RECESSED LIGHT FIXTURES

(71) Applicant: SIGNIFY HOLDING B.V., Eindhoven (NL)

(72) Inventors: Nam Chin Cho, Peachtree City, GA (US); Parth Joshi, Sugar Hill, GA (US); David George Watt, Forest Park, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/118,131

(22) Filed: Aug. 30, 2018

(65) Prior Publication Data
US 2019/0075634 A1 Mar. 7, 2019

Related U.S. Application Data

(60) Provisional application No. 62/553,709, filed on Sep. 1, 2017.

(51) Int. Cl.
H05B 47/19 (2020.01)
H05B 47/12 (2020.01)
F21S 8/02 (2006.01)
F21V 23/04 (2006.01)

(52) U.S. Cl.
CPC .............. H05B 47/19 (2020.01); F21S 8/026 (2013.01); F21V 23/045 (2013.01); H05B 47/12 (2020.01)

(58) Field of Classification Search
CPC ............ H05B 37/0272; H05B 37/0236; F21V 23/045; F21V 23/008; F21V 23/006; F21S 8/026
See application file for complete search history.

(56) References Cited

U.S. PATENT DOCUMENTS

| 10,034,358 | B1* | 7/2018 | Chen | H05B 37/0272 |
| 10,271,019 | B1* | 4/2019 | Berg | H04N 7/183 |
| 2008/0143495 | A1* | 6/2008 | Haase | F21K 9/00 340/326 |
| 2009/0052170 | A1* | 2/2009 | Jeng | F21S 2/005 362/233 |
| 2009/0085497 | A1* | 4/2009 | Osborn | E04D 13/03 315/294 |
| 2011/0242810 | A1* | 10/2011 | Lopez Querol | E04D 13/03 362/249.02 |
| 2012/0120243 | A1* | 5/2012 | Chien | H04N 5/2354 348/159 |
| 2012/0127708 | A1* | 5/2012 | Chien | F21V 17/02 362/234 |

(Continued)

FOREIGN PATENT DOCUMENTS

GB 2524664 A * 9/2015

OTHER PUBLICATIONS

International Search Report for PCT/US18/048914, dated Dec. 20, 2018.

*Primary Examiner* — Leah Simone Macchiarolo
(74) *Attorney, Agent, or Firm* — Akarsh P. Belagodu

(57) ABSTRACT

A trim for a lighting fixture includes a trim structure, a processor disposed on the trim structure, and an interface electrically coupled to the processor. A power is provided to the processor from a power source of the lighting fixture via the interface.

20 Claims, 9 Drawing Sheets

(56) References Cited

U.S. PATENT DOCUMENTS

| | | | |
|---|---|---|---|
| 2012/0127759 A1* | 5/2012 | Chien | F21S 8/035 |
| | | | 362/641 |
| 2012/0274208 A1* | 11/2012 | Chen | H01Q 1/38 |
| | | | 315/34 |
| 2012/0320627 A1* | 12/2012 | Araki | F21S 8/04 |
| | | | 362/608 |
| 2013/0231796 A1 | 9/2013 | Lu et al. | |
| 2015/0002046 A1 | 1/2015 | Schlangen | |
| 2015/0271375 A1* | 9/2015 | Chien | F21V 33/0052 |
| | | | 348/159 |
| 2015/0338077 A1* | 11/2015 | Johnson | F21V 23/0435 |
| | | | 362/234 |
| 2015/0351187 A1 | 12/2015 | McBryde et al. | |
| 2015/0373307 A1 | 12/2015 | Huang et al. | |
| 2017/0105272 A1 | 4/2017 | Johnson | |
| 2017/0244934 A1* | 8/2017 | Chien | H04N 7/181 |
| 2017/0251539 A1 | 8/2017 | Cho et al. | |
| 2017/0347073 A1* | 11/2017 | Shimizu | F21S 8/00 |
| 2017/0363276 A1* | 12/2017 | Chien | F21V 7/0008 |
| 2018/0058637 A1* | 3/2018 | Thiel | F21K 9/272 |
| 2018/0231240 A1* | 8/2018 | Roca | F21V 33/0092 |
| 2019/0011818 A1* | 1/2019 | Chien | F21S 10/007 |

\* cited by examiner

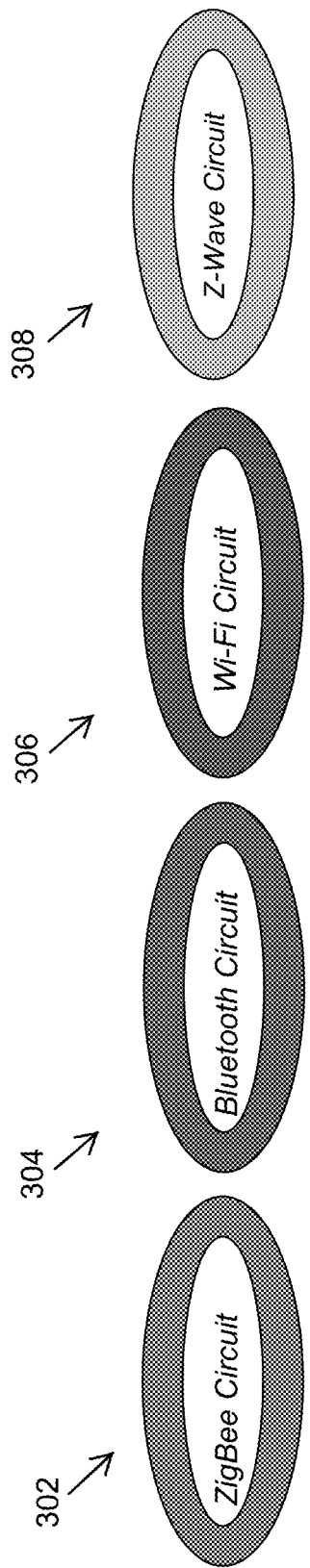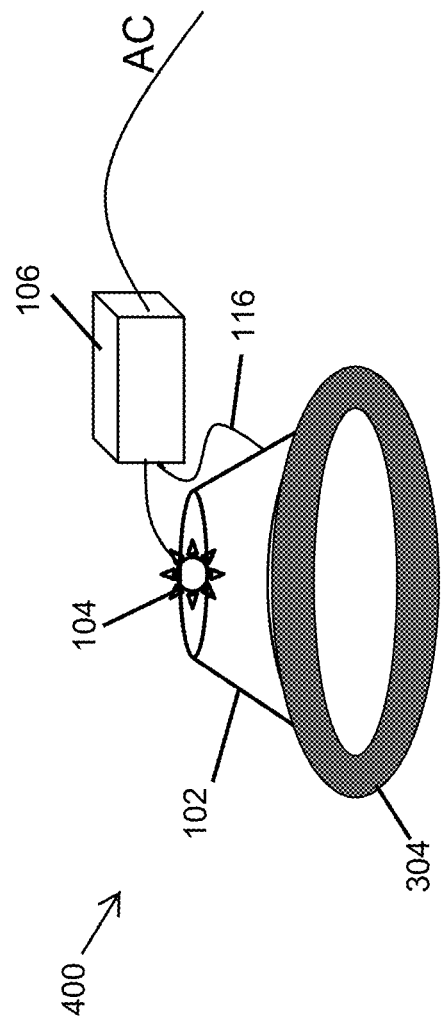

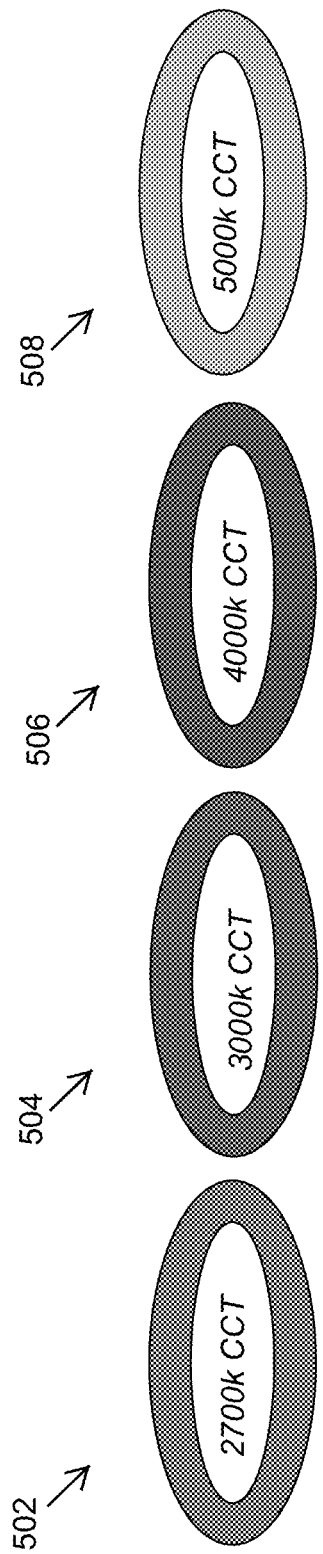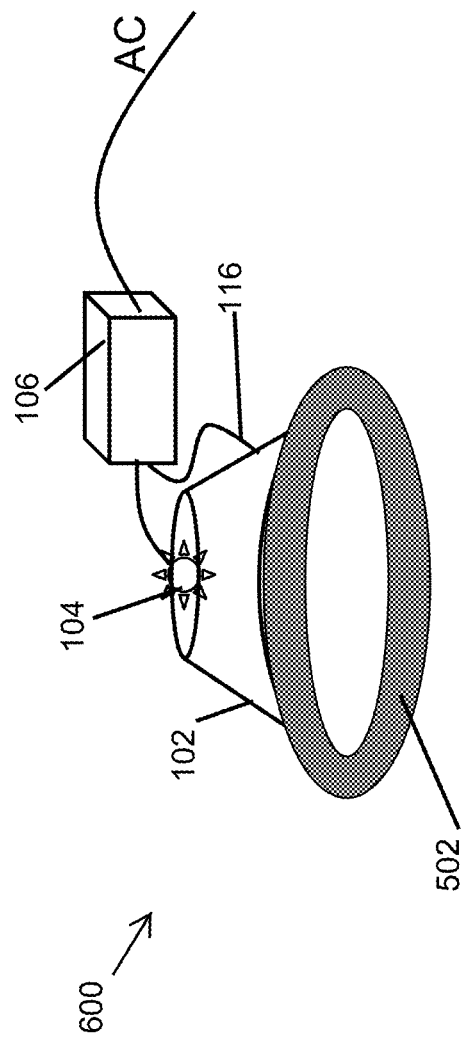

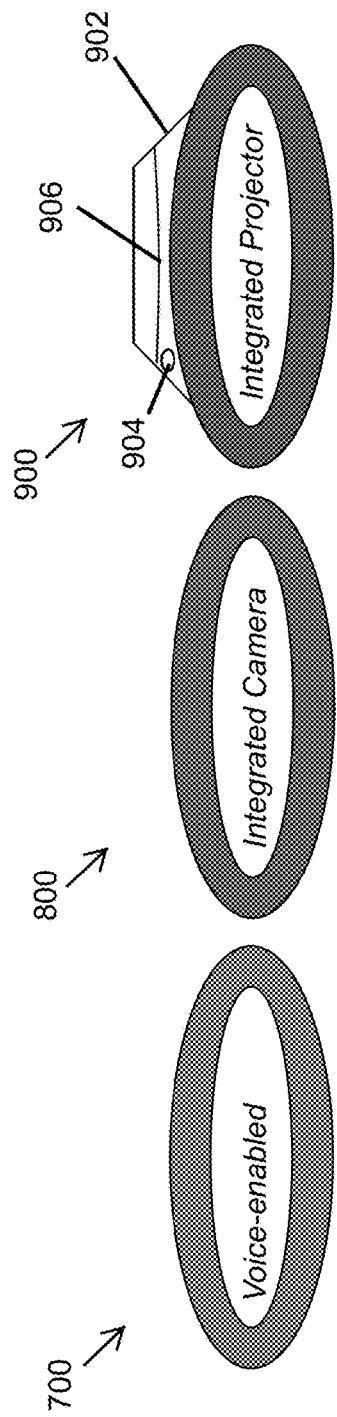
FIG. 7
FIG. 8
FIG. 9
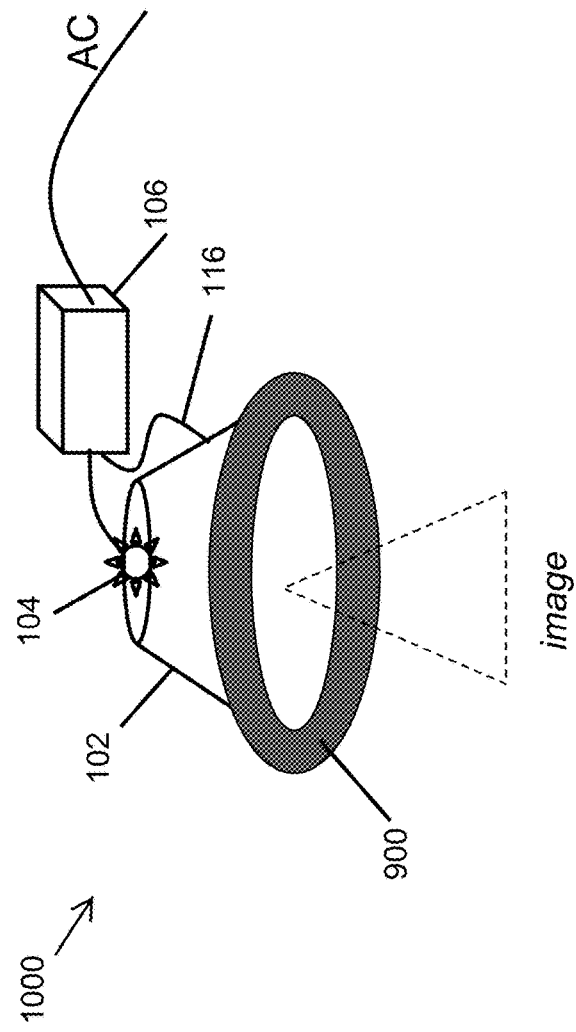
FIG. 10

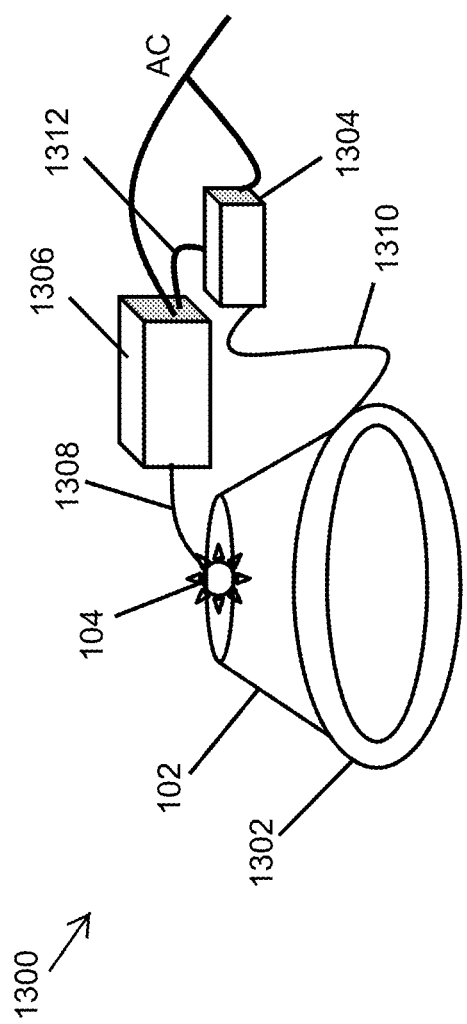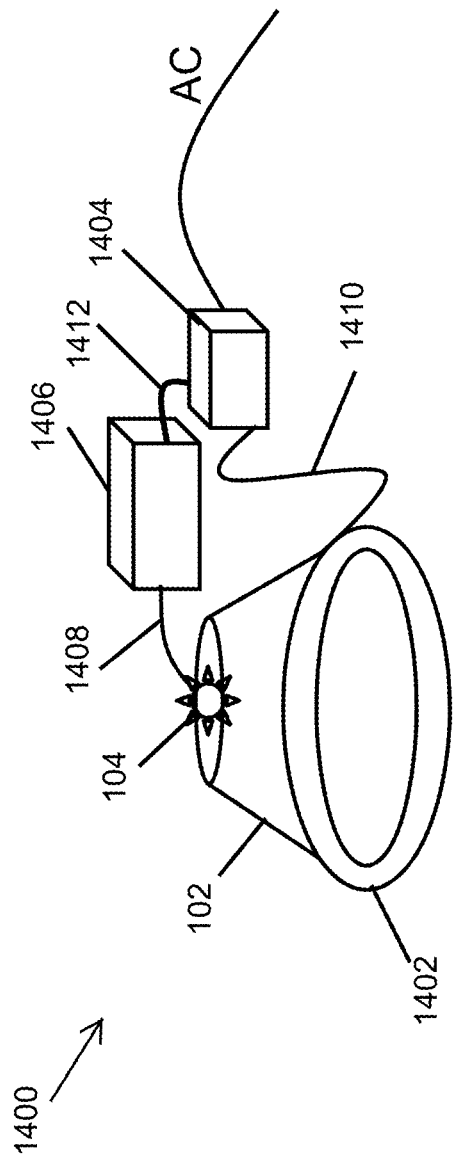

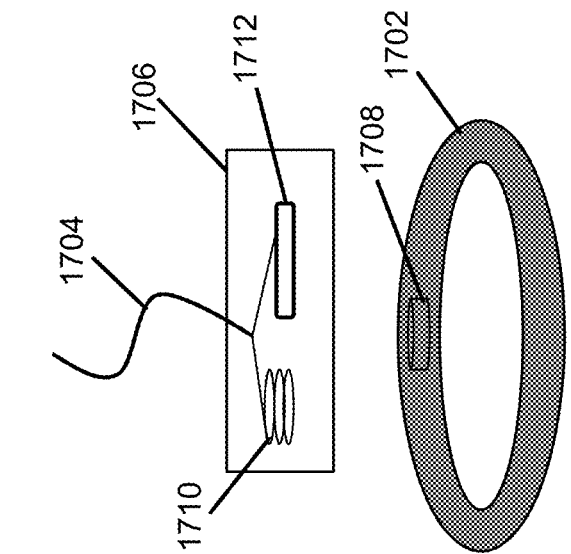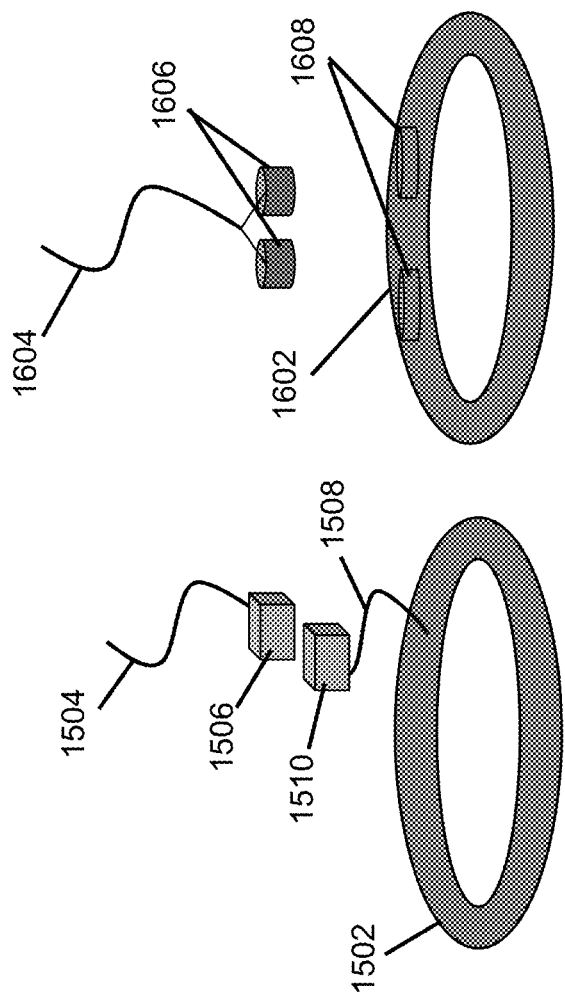

SMART TRIMS FOR RECESSED LIGHT FIXTURES

CROSS REFERENCE TO RELATED APPLICATIONS

The present application claims priority under 35 U.S.C. Section 119(e) to U.S. Provisional Patent Application No. 62/553,709, filed Sep. 1, 2017 and titled "Smart Trims for Recessed Light Fixtures," the entire content of which is incorporated herein by reference.

TECHNICAL FIELD

Embodiments of the technology relate generally to lighting fixtures and more particularly to a lighting fixture trim that includes one or more processing, sensing, output, communication, or control components.

BACKGROUND

Lighting fixtures may be controlled wirelessly. Some lighting fixtures may also operate based on detection information from one or more sensors. Further, recessed lighting fixtures can often be ideally located for the placement of audio and other devices, such as microphones and speakers. However, embedding wireless and sensing capabilities into recessed lighting fixtures can be challenging, for example, due to the physical location of the power supplies that drive the light source. To illustrate, power supplies are typically located deep within a ceiling away from the preferred locations for wireless, sensor, audio, and video components that need to be close to the ceiling or that need to be exposed to the surface below the ceiling. Placing some components, such a motion sensors, microphone arrays, speakers, etc., inside a lighting fixture housing may not always be practical. Further, components integrated with a lighting fixture are generally permanently dedicated for the lighting fixture and may require replacement of the lighting fixture or significant work to replace the integrated component. Thus, a solution that simplifies the integration of components such as wireless devices, sensors, audio and video components with recessed lighting fixtures may be desirable.

SUMMARY

The present disclosure relates generally to lighting, and more particularly to an adjustably attachable sensor housing for use with lighting fixtures. In an example embodiment, a trim for a lighting fixture includes a trim structure, a processor disposed on the trim structure, and an interface electrically coupled to the processor. A power is provided to the processor from a power source of the lighting fixture via the interface.

In another example embodiment, a lighting fixture includes a housing, a light source disposed in the housing, and a trim detachably attached to the housing. The trim includes a trim structure, a processor disposed on the trim structure, and an interface electrically coupled to the processor, where a power is provided to the processor via the interface.

In another example embodiment, a lighting fixture includes a housing, a light source disposed in the housing, a base trim attached to the housing, and a smart trim detachably attached to the base trim and covering the base trim from below the lighting fixture. The smart trim includes a trim structure, a processor disposed on the trim structure, and an interface electrically coupled to the processor, where a power is provided to the processor via the interface.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIGS. 3A-3D illustrate smart trims configured for different communication standards according to an example embodiment;

FIG. 4 illustrates a lighting fixture including a smart trim configured for Bluetooth communication according to an example embodiment;

FIGS. 5A-5D illustrate smart trims configured for different color temperature according to an example embodiment;

FIG. 6 illustrates a lighting fixture including a smart trim configured for 2700K color temperature according to an example embodiment;

FIG. 7 illustrates a smart trim with voice capability according to an example embodiment;

FIG. 8 illustrates a smart trim with an integrated camera according to an example embodiment;

FIG. 9 illustrates a smart trim with an integrated projector according to an example embodiment;

FIG. 10 illustrates a lighting fixture including a smart trim with an integrated projector according to an example embodiment;

FIG. 13 illustrates a lighting fixture including a smart trim and a dedicated power module according to an example embodiment;

FIG. 14 illustrates a lighting fixture including a smart trim and a dedicated power module according to another example embodiment;

FIG. 15 illustrates a power and communication connection of a smart trim according to an example embodiment;

FIG. 16 illustrates a power and communication connection of a smart trim according to another example embodiment; and FIG. 17 illustrates a power and communication connection of a smart trim according to another example embodiment.

Figure 1:
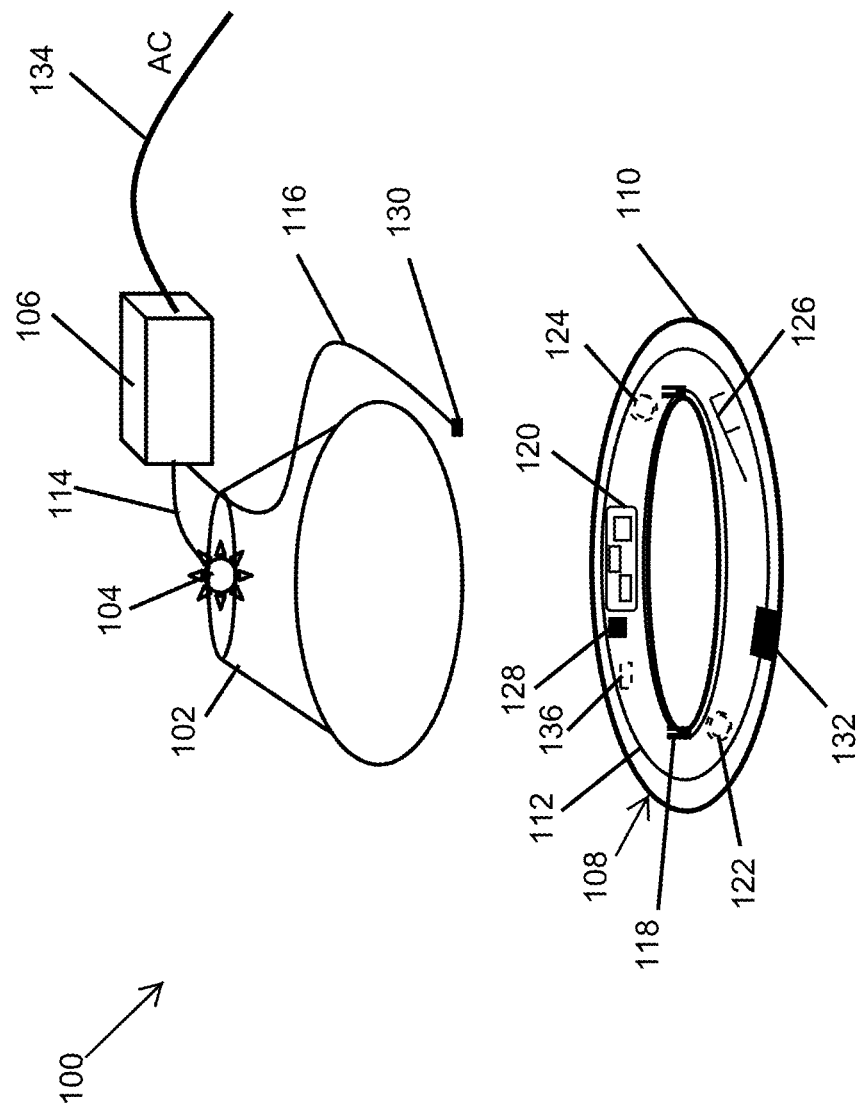
FIG. 1 illustrates a lighting fixture including a smart trim shown detached from a housing of the lighting fixture according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings designate like or corresponding but not necessarily identical elements.

DETAILED DESCRIPTION OF EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

In some example embodiments, a trim may be used as a modular structure of recessed lighting fixtures allowing a variety of sensing and other capabilities to be added to lighting fixtures. Various components can be placed, for example, on the back side of a trim that is outside of view from below a ceiling. For example, components can be placed on a single printed circuit board (PCB) mounted on the back side of the trim. Alternatively, different components can be mounted at various locations on the trim. For example, components can be placed on the back, front, or sides of the trim, or on the baffle or other structures extending from the back side of the trim.

In some example embodiments, a recessed lighting fixture may provide a platform for power and communication connections to and from components that are disposed on, for example, the back side of the trim or on a baffle extending from the trim. In some cases, the trim can have knockouts and/or openings to accommodate sensors and other components that need to be positioned exposed to the space below a ceiling. Non-exclusive examples of hardware that can be incorporated in the trim include one or more processors, radios or transceivers, switches, microphones, speakers, cameras, projectors, batteries, and indicator lights. Non-exclusive examples of sensors that can be incorporated in a trim include one or more photocells, occupancy sensors, carbon monoxide sensors, smoke sensors, carbon dioxide sensors, humidity sensors, temperature sensors, and air quality sensors. The trim may be attachable to an existing base trim allowing new capabilities and features to be added to lighting fixtures. The trim may also be a replaceable trim allowing different or updated capabilities to be added to lighting fixtures. In general, by utilizing the exposed space between a ceiling and a trim and the modularity of trims, end users can easily change and/or configure various connected and sensing features of their fixtures.

Turning now to the figures, particular example embodiments are described. FIG. 1 illustrates a lighting fixture 100 including a smart trim 108 shown detached from a housing 102 of the lighting fixture according to an example embodiment. In some example embodiments, the lighting fixture 100 includes the housing 102, a light source 104, a driver 106, and the smart trim 108. The smart trim 108 may be removably/detachably attached to the housing 102 using one or more attachment means, such as one or more of torsion springs, friction clips, snap fittings, adhesives, magnets, and other coupling mechanisms including tabs and slots. For example, one or more clips 118 may be used to securely attach the smart trim 108 to the housing 102.

In some example embodiments, the driver 106 may receive power, such as AC power, via an electrical cable 134 and provide output power to the light source 104 and to components of the smart trim 108. For example, the light source 104 may be a light emitting diode (LED) light source, and the driver 106 may be or may include a constant current power supply that provides compatible power to the light source 104 via an electrical cable 114. Alternatively, the driver 106 may be or may include a voltage source. The driver 106 may also provide power to the smart trim 108 via an electrical cable 116 terminated by a connector 130. The electrical cable 116, which may include multiple electrical wires, may also be used for one-way or two-way communication between the driver 106 and the smart trim 108.

In some example embodiments, the smart trim 108 includes a trim structure 110 and a PCB 112. The trim structure 110 has an outer perimeter and an inner perimeter, wherein the inner perimeter surrounds an opening designed to line up with an opening of the housing 102 to allow light from the light source 104 to exit the housing 102. The trim structure 110 may include one or more one or more clips 118 or other attachment structures that can used to securely attach the smart trim 108 to the housing 102. The one or more clips 118 or other attachment structures may securely attach the smart trim 108 to the housing 102 while allowing the smart trim 108 to be conveniently detached from the housing 102. For example, the smart trim 108 may be replaced by another smart trim or a regular trim.

In some example embodiments, the PCB 112 may be attached to the trim structure 110 on the back side of the trim structure 110 as shown in FIG. 1, where the back side of the trim structure is outside of view from the area illuminated by the light from the light source 104 when the lighting fixture 100 is installed. For example, the PCB 112 may be attached to the trim structure 110 using one or more fasteners 132, such as clips. Other attachment means, such as an adhesive, may be used to securely attach the PCB 112 to the trim structure 110 instead of or in addition to the one or more fasteners 132. In some alternative embodiments, the PCB 112 may be positioned on the trim structure 110 without the use of a fastener.

In some example embodiments, the PCB 112 may include multiple components that are attached to one or more sides of the PCB 112. For example, the PCB 112 may include a processor (or a controller) 120, a sensor 122, a microphone 124, and a radiofrequency antenna 126. The sensor 122 may be on the side of the PCB 112 facing the trim structure 110 and may be disposed at least partially over an aperture in the trim structure 110 to have exposure to a space below the lighting fixture 100 after the lighting fixture 100 is installed in a ceiling. The microphone 124 may also be on the side of the PCB 112 facing the trim structure 110 and may be disposed at least partially over an aperture in the trim structure 110 to allow sound to easily reach the microphone 124 from below the lighting fixture 100 after the lighting fixture 100 is installed in a ceiling.

In some example embodiments, the sensor 122 may include one or more of a light sensor, an occupancy sensor, a carbon monoxide sensor, a smoke sensor, a carbon dioxide sensor, a humidity sensor, a temperature sensor, and an air quality sensor. For example, the sensor 122 may include an occupancy sensor such as a motion sensor (e.g., a PIR sensor), a camera, etc.

In some example embodiments, the microphone 124 may include a single microphone or an array of microphones. For example, the microphone 124 may include one or more analog microphones. As another example, the microphone 124 may include other components such as an amplifier and an analog-to-digital converter.

In some example embodiments, the processor 120 may process electrical signals from the sensor 122, the microphone 124, the antenna 126, and other components of the PCB 112. For example, the processor 120 may be electrically coupled to the sensor 122, the microphone 124, the antenna 126, and other components via traces in the PCB 112 and/or electrical wires. The processor 120 may include a microprocessor or a microcontroller and other components, such as memory devices, a power converter, an analog-to-digital converter and a digital-to-analog converter. The processor 120 may also include communication interfaces and components such as one or more serial and/or parallel communication interfaces, a wired and/or wireless receiver, transmitter and/or transceiver, etc.

In some example embodiments, the driver 106 may provide power to components of the smart trim 108 via the cable 116. The electrical cable 116 may include one or more electrical wires and may be terminated by the connector 130. The connector 130 may be designed to mate with a connector 128 that may be electrically and physically coupled (e.g., soldered) to the PCB 112 to provide an electrical interface for providing power to the components of the PCB 112 and for communication to and from the components of the PCB 112. To illustrate, the connector 128 may be coupled to the PCB 112, where the power provided by the driver 106 via the cable 116 may be routed to other components of the PCB 112. In some alternative embodiments, the connector 128 may be coupled to an electrical cable that is attached (e.g., soldered) to the PCB 112. Alternatively, the connectors 128, 130 may be omitted, and the cable 116 may be electrically coupled to the components of the PCB 112 by other means.

In some example embodiments, the processor 120 can provide control signals to the driver 106 via the cable 116. For example, the processor 120 may provide a control signal to the driver to turn on, off, adjust dim level and/or color temperature of the light emitted by the light source 104. The processor 120 may provide control signals, such as a pulse width modulation (PWM) signal, to the driver 106 based on a signal received by the processor 120 from the sensor 122, the microphone 124, or via the antenna 126. Alternatively or in addition, the PCB 112 or another component of the smart trim 108 may include a passive component 136 (e.g., a dip switch) that can be configured, for example, during installation or at manufacturing, such that a particular lighting control signal (e.g., a particular dim level or color temperature adjustment or setting signal) is provided to the driver 106 by the smart trim 108 via the cable 116. The PCB 112 may also be hardwired such that a particular lighting control signal (e.g., a particular dim level or color temperature adjustment or setting signal) is provided to the driver 106 by the smart trim 108 via the cable 116. The driver 106 may adjust the power provided to the light source 104 to control/adjust the light emitted by the light source 104 based on a lighting control signal provided by the processor 120 of the smart trim 108.

In some example embodiments, the processor 120 may receive communication signals from the driver 106 via the cable 116 and may process and/or transmit the information conveyed by the signal via the antenna 126. The processor 120 may also transmit, via the antenna 126, information received from the sensor 120, the microphone 124, and/or other components of the smart trim 108 and/or generated by processing such information. In general, the processor 120 may receive and transmit wireless signals compliant with one or more wireless protocols such as Bluetooth, Wi-Fi, ZigBee, etc.

In some example embodiments, the trim structure 110 may be made from metal, plastic, or other types of material using methods typically used to make lighting fixture trims known by those of ordinary skill in the art. In some example embodiments, the smart trim 108 may include a baffle that extends up from the trim structure 110 into the cavity of the housing 102, and one or more components (e.g., a sensor) may be attached to the baffle. In some example embodiments, the smart trim 108 may include, on the PCB 112, on another PCB, or as a separate component, other devices including one or more processors, microphones, or sensors. The smart trim 108 may also include one or more speakers, cameras, projectors, batteries, and indicator light sources.

Integrating desired electronic components and circuitry, including microcontrollers, wireless transceivers, and sensors, with a trim of recessed lighting fixtures allows for the modularity of control and connected fixtures. For example, a smart trim that has desired features (e.g., a wireless and occupancy sensing capabilities) can be added to a lighting fixture by replacing the existing trim (e.g., regular trim or another smart trim) or by adding the smart trim to the existing trim. Adding a smart trim to a recessed lighting fixture may avoid the need to replace the lighting fixture in order to add new features or because failed electronic components. By utilizing smart trims such as the smart trim 108, a consumer can easily change and/or add various features including communication and control features to recessed lighting fixtures.

In some example embodiments, the lighting fixture 100 may be recessed in a ceiling, a wall, or another surface. In some alternative embodiments, the components of the PCB 112 may be at different locations than shown. In some example embodiments, the smart trim 108 may include multiple PCBs instead of just one PCB 112. In some example embodiments, individual components, instead or in addition to one or more PCBs, may be positioned on and/or attached to the trim structure 110. For example, the PCB 112 may be omitted and the components may be packaged components that can be positioned on the trim structure 110 and that can be connected via electrical wires. In some alternative embodiments, the smart trim 108 may include more or fewer components than shown without departing from the scope of this disclosure. In some alternative embodiments, one or more components of the lighting fixture 100 including smart trim 108 may have a different shape than the circular shape shown without departing from the scope of this disclosure. For example, the smart trim 108 may have a rectangular shape, a triangular shape, another shape, a mix of different inner and outer perimeter shapes, etc. without departing from the scope of this disclosure. To illustrate, the trim structure 110 may have a rectangular shape, a triangular shape, another shape, a mix of different inner and outer perimeter shapes, etc. without departing from the scope of this disclosure. In some example embodiments, the smart trim 108 may include other components including movable components without departing from the scope of this disclosure. In some alternative embodiments, the smart trim 108 may include a baffle that extends up, for example, from the trim structure 110 such that the baffle is positioned in the cavity of the housing 102 when the smart trim 108 is attached to the housing 102.

Figure 2:
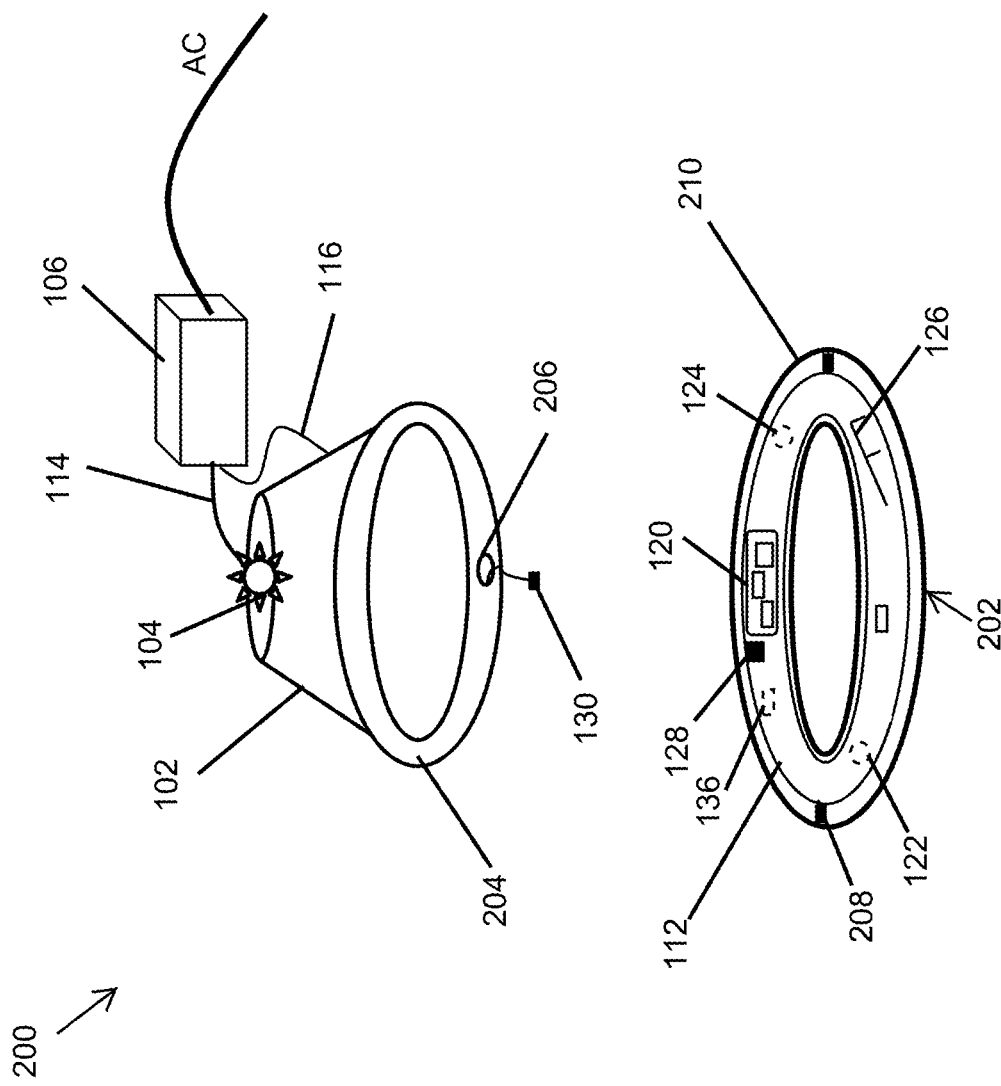
FIG. 2 illustrates a lighting fixture including a smart trim shown detached from a housing of the lighting fixture according to another example embodiment.

FIG. 2 illustrates a lighting fixture 200 including a smart trim 202 shown detached from the housing 102 of the lighting fixture 202 according to another example embodiment. In some example embodiments, the lighting fixture 200 includes the housing 102, the light source 104, and the driver 106. For example, the driver 106 and the light source 104 may operate in the same manner as described with respect to the lighting fixture 100 to provide power to the light source 104. In some example embodiments, the lighting fixture 200 includes a smart trim 202 and a base trim 204. The base trim 204 may be attached to the housing 102 by an attachment means, such as one or more fasteners, or may be integrally formed with the housing 102. For example, the base trim 204 may serve as a recessed lighting fixture trim when the lighting fixture 200 is installed without the smart trim 202.

In some example embodiments, the smart trim 202 may include a trim structure 210 and the PCB 112 described with respect to FIG. 1. The trim structure 210 has an outer perimeter and an inner perimeter, wherein the inner perimeter surrounds an opening designed to line up with an opening of the housing 102 to allow a light from the light source 104 to exit the housing 102. The PCB 112 may include the processor 120, the sensor 122, the microphone 124, the antenna 126, and other components described with respect to the smart trim 108. The processor 120 may receive and process signals from the sensor 122 and from the microphone 124 and transmit wireless signals via the antenna 126 as described above with the lighting fixture 100. Further the processor 120 may provide lighting control signals to the driver 106 via the cable 116 to turn on, turn off, and/or adjust dim level, color temperature, etc. of the light emitted by the light source 104. The driver 106 may also receive communications signals from the driver 106 via the cable 116 or another electrical cable.

In some example embodiments, the trim structure 210 may also be identical or substantially similar to the trim structure 110 described above. For example, the trim structure 210 may be made from the same material and/or in the same manner as the trim structure 110. The PCB 112 may also be attached to the trim structure 210 in the same manner as described with respect to the smart trim 108.

In some example embodiments, the smart trim 202 may be securely but removably attached to the housing 102 or the base trim 204 using one or more attachment means, such as one or more of torsion springs, friction clips, snap fittings, adhesives, magnets, and other coupling mechanisms including tabs and slots. For example, one or more clips 208 may be used to securely and removably attach the smart trim 202 to the base trim 204.

In some example embodiments, the base trim 204 may include a hole 206 for routing the electrical cable 116 to the smart trim 202. The connector 130 terminating the cable 130 is designed to mate with the connector 128 of the smart trim 202. The hole 206 may be formed by removing knocking section in the base trim 204 or by cutting out the hole 206 in the base trim 204. In some alternative embodiments, the hole 206 may be omitted, and the cable 116 and the connector may extend to the PCB 112 around the outer perimeter of the base trim 204. For example, the trim structure 210 may have a larger outer diameter than the outer diameter of the base trim 204. In some alternative embodiments, the connectors 128, 130 may be omitted and the cable 116 may be electrically coupled to the components of the PCB 112 by other means.

In some example embodiments, the smart trim 202 may be used to adjust and/or add to features of the lighting fixture 200 in the same manner as described above with respect to the smart trim 108. By utilizing smart trims such as the smart trim 202, a consumer can easily change and/or add various features including communication and control features to recessed lighting fixtures.

In some alternative embodiments, the components of the PCB 112 may be at different locations than shown. In some example embodiments, the smart trim 202 may include multiple PCBs instead of just one PCB 112. In some example embodiments, individual components, instead or in addition to one or more PCBs, may be positioned on and/or attached to the trim structure 210. In some alternative embodiments, the smart trim may include more or fewer components than shown without departing from the scope of this disclosure. In some alternative embodiments, one or more components of the lighting fixture 200 including smart trim 202 may have a different shape than shown without departing from the scope of this disclosure. For example, the smart trim 202 may have a rectangular shape, a triangular shape, a mix of different inner and outer perimeter shapes, etc. without departing from the scope of this disclosure. To illustrate, the trim structure 210 may have a rectangular shape, a triangular shape, another shape, a mix of different inner and outer perimeter shapes, etc. without departing from the scope of this disclosure. In some example embodiments, the smart trim 202 may include other components including movable components without departing from the scope of this disclosure. In some alternative embodiments, the smart trim 202 may include a baffle that extends up, for example, from the trim structure 210 such that the baffle is positioned in the cavity of the housing 102 when the smart trim 108 is attached to the housing 102 or to the base trim 204.

FIGS. 3A-3D illustrate smart trims 302-308 configured for different communication standards according to an example embodiment. In some example embodiments, the smart trim 302 may correspond to the smart trim 108 of FIG. 1, where the PCB 112 of the smart trim 108 includes the processor 120 configured to communicate wirelessly based on the ZigBee wireless communication standard. The smart trim 302 may alternatively correspond to the smart trim 202 of FIG. 2, where the PCB 112 of the smart trim 202 includes the processor 120 configured to communicate wirelessly based on the ZigBee wireless communication standard. As described above with respect to the smart trims 108, 202, the processor of the smart trim 302 may include a transceiver for transmitting and receiving wireless signals, for example, via the antenna of the smart trim 302. The processor of the smart trim 302 may also include a microprocessor, a microcontroller, and other components/circuits, and may execute a software code stored in a memory device of the processor to transmit and receive wireless signals in compliance with the ZigBee wireless communication standard.

In some example embodiments, the smart trim 304 may correspond to the smart trim 108 of FIG. 1, where the PCB 112 includes the processor 120 configured to communicate wirelessly based on the Bluetooth wireless communication standard. The smart trim 304 may alternatively correspond to the smart trim 202 of FIG. 2, where the PCB 112 includes the processor 120 configured to communicate wirelessly based on the Bluetooth wireless communication standard. As described above with respect to the smart trims 108, 202, the processor of the smart trim 304 may include a transceiver for transmitting and receiving wireless signals, for example, via the antenna of the smart trim 304. The processor of the smart trim 304 may also include a microprocessor, a microcontroller, and other components/circuits, and may execute a software code stored in a memory device of the processor to transmit and receive wireless signals in compliance with the Bluetooth wireless communication standard.

In some example embodiments, the smart trim 306 may correspond to the smart trim 108 of FIG. 1, where the PCB 112 includes the processor 120 configured to communicate wirelessly based on the Wi-Fi wireless communication standard. The smart trim 306 may alternatively correspond to the smart trim 202 of FIG. 2, where the PCB 112 includes the processor 120 configured to communicate wirelessly based on the Wi-Fi wireless communication standard. As described above with respect to the smart trims 108, 202, the processor of the smart trim 306 may include a transceiver for transmitting and receiving wireless signals, for example, via the antenna of the smart trim 306. The processor of the smart trim 306 may also include a microprocessor, a microcontroller, and other components/circuits, and may execute a software code stored in a memory device of the processor to transmit and receive wireless signals in compliance with the Wi-Fi wireless communication standard.

In some example embodiments, the smart trim 308 may correspond to the smart trim 108 of FIG. 1, where the PCB 112 includes the processor 120 configured to communicate wirelessly based on the Z-Wave wireless communication protocol. The smart trim 308 may alternatively correspond to the smart trim 202 of FIG. 2, where the PCB 112 includes the processor 120 configured to communicate wirelessly based on the Z-Wave wireless communication protocol. As described above with respect to the smart trims 108, 202, the processor of the smart trim 308 may include a transceiver for transmitting and receiving wireless signals, for example, via the antenna of the smart trim 308. The processor of the smart trim 308 may also include a microprocessor, a microcontroller, and other components/circuits, and may execute a software code stored in a memory device of the processor to transmit and receive wireless signals in compliance with the Z-Wave wireless communication protocol.

In some example embodiments, the smart trims 302-308 may each include a PCB other than the PCB 112 without departing from the scope of this disclosure. In some example embodiments, the smart trims 302-308 may each support communication in compliance with other communication standards. In some alternative embodiments, the smart trims 302-308 may each include the PCB 112 with additional components and/or without some of the components described above with respect to the smart trims 108, 202. In some alternative embodiments, the smart trims 302-308 may each have a different shape than shown without departing from the scope of this disclosure.

FIG. 4 illustrates a lighting fixture 400 including the smart trim 304 configured for Bluetooth communication according to an example embodiment. Referring to FIGS. 1-4, in some example embodiments, the lighting fixture 400 may correspond to the lighting fixture 100 or the lighting fixture 200. For example, the smart trim 304 may be attached to the housing 102 as described with respect to the lighting fixture 100. Alternatively, the smart trim 304 may be attached to the base trim, such as the base trim 204, as described with respect to the lighting fixture 200.

In some example embodiments, the smart trim 304 may receive and process Bluetooth signals and perform functions, such as control the light source 104 of the lighting fixture 400, based on the received Bluetooth signals. To illustrate, the processor of the smart trim 304 may provide lighting control signals to the driver 106 via the cable 116 to control the power provided to the light source 104 by the driver 106.

In some alternative embodiments, the smart trim 302, the smart trim 306, and the smart trim 308 may each be used instead of the smart trim 304 in the lighting fixture 400. For example, the smart trim 304 may be removably attached to the housing 102 or the base trim 204 (when present), and the smart trim 304 may be replaced by another smart trim to provide a different communication capability. In some alternative embodiments, the smart trim 304 may have the capability to wirelessly communicate with wireless signals that are compliant with other wireless communication standards including ZigBee, Wi-Fi, and Z-Wave.

FIGS. 5A-5D illustrate smart trims 502-508 configured for different color temperature according to an example embodiment. In some example embodiments, the smart trim 502 of FIG. 5A may correspond to the smart trim 108 of FIG. 1, where the PCB 112 of the smart trim 108 includes the processor 120 configured to provide a lighting control signal (e.g., one or more PWM signals or CCT setting signals) intended to result in a light that has a correlated color temperature (CCT) of 2700K. The smart trim 502 may alternatively correspond to the smart trim 202 of FIG. 2, where the PCB 112 of the smart trim 108 includes the processor 120 configured to provide a lighting control signal (e.g., one or more PWM signals or CCT setting signals) intended to result in a light that has a correlated color temperature (CCT) of 2700K. In some alternative embodiments, the smart trim 502 may be hardwired to provide a lighting control signal intended to result in a light that has a correlated color temperature (CCT) of 2700K. In yet some alternative embodiments, the smart trim 502 may include a passive component, such as a dip switch that can be set to select one of multiple CCT settings, such that the smart trim 502 provides a lighting control signal intended to result in a light that has a correlated color temperature (CCT) of 2700K.

In some example embodiments, the smart trim 504 of FIG. 5B may correspond to the smart trim 108 of FIG. 1, where the PCB 112 of the smart trim 108 includes the processor 120 configured to provide a lighting control signal (e.g., one or more PWM signals or CCT setting signals) intended to result in a light that has a correlated color temperature (CCT) of 3000K. The smart trim 504 may alternatively correspond to the smart trim 202 of FIG. 2, where the PCB 112 of the smart trim 108 includes the processor 120 configured to provide a lighting control signal (e.g., one or more PWM signals or CCT setting signals) intended to result in a light that has a correlated color temperature (CCT) of 3000K. In some alternative embodiments, the smart trim 504 may be hardwired to provide a lighting control signal intended to result in a light that has a correlated color temperature (CCT) of 3000K. In yet some alternative embodiments, the smart trim 504 may include a passive component, such as a dip switch that can be set to select one of multiple CCT settings, such that the smart trim 504 provides a lighting control signal intended to result in a light that has a correlated color temperature (CCT) of 3000K.

In some example embodiments, the smart trim 506 of FIG. 5C may correspond to the smart trim 108 of FIG. 1, where the PCB 112 of the smart trim 108 includes the processor 120 configured to provide a lighting control signal (e.g., one or more PWM signals or CCT setting signals) intended to result in a light that has a correlated color temperature (CCT) of 4000K. The smart trim 506 may alternatively correspond to the smart trim 202 of FIG. 2, where the PCB 112 of the smart trim 108 includes the processor 120 configured to provide a lighting control signal (e.g., one or more PWM signals or CCT setting signals) intended to result in a light that has a correlated color temperature (CCT) of 4000K. In some alternative embodiments, the smart trim 506 may be hardwired to provide a lighting control signal intended to result in a light that has a correlated color temperature (CCT) of 4000K. In yet some alternative embodiments, the smart trim 506 may include a passive component, such as a dip switch that can be set to select one of multiple CCT settings, such that the smart trim 506 provides a lighting control signal intended to result in a light that has a correlated color temperature (CCT) of 4000K.

In some example embodiments, the smart trim 508 of FIG. 5D may correspond to the smart trim 108 of FIG. 1, where the PCB 112 of the smart trim 108 includes the processor 120 configured to provide a lighting control signal (e.g., one or more PWM signals or CCT setting signals) intended to result in a light that has a correlated color temperature (CCT) of 5000K. The smart trim 506 may alternatively correspond to the smart trim 202 of FIG. 2, where the PCB 112 of the smart trim 108 includes the processor 120 configured to provide a lighting control signal (e.g., one or more PWM signals or CCT setting signals) intended to result in a light that has a correlated color temperature (CCT) of 5000K. In some alternative embodiments, the smart trim 506 may be hardwired to provide a lighting control signal intended to result in a light that has a correlated color temperature (CCT) of 5000K. In yet some alternative embodiments, the smart trim 506 may include a passive component, such as a dip switch that can be set to select one of multiple CCT settings, such that the smart trim 506 provides a lighting control signal intended to result in a light that has a correlated color temperature (CCT) of 5000K.

In some example embodiments, the smart trims 502-508 may each include a PCB other than the PCB 112 without departing from the scope of this disclosure. In some example embodiments, the smart trims 502-508 may each support communication in compliance with other communication standards. In some alternative embodiments, the smart trims 502-508 may each include the PCB 112 with additional components and/or without some of the components described above with respect to the smart trims 108, 202. In some alternative embodiments, the smart trims 502-508 may each have a different shape than shown without departing from the scope of this disclosure. In some alternative embodiments, the smart trims 502-508 may each be configured to provide control signal intended to result in a light that has a CCT others than the CCTs described above.

FIG. 6 illustrates a lighting fixture 600 including the smart trim 502 of FIG. 5A configured for 2700K CCT according to an example embodiment. Referring to FIGS. 1, 2, 5A-5D, and 6, in some example embodiments, the lighting fixture 600 may correspond to the lighting fixture 100 or the lighting fixture 200. For example, the smart trim 502 may be attached to the housing 102 as described with respect to the lighting fixture 100. Alternatively, the smart trim 502 may be attached to the base trim, such as the base trim 204, as described with respect to the lighting fixture 200.

In some example embodiments, the smart trim 502 may include the processor 120 that is configured to provide a lighting control signal (e.g., one or more PWM signals) to the driver 106 via the cable 116, and the driver 106 may adjust the power provided to the light source 104 to adjust or set the CCT of the light emitted by the light source 104 to 2700K. In some example embodiments, the processor 120 of the smart trim 502 may provide one or more signal that control the CCT setting of the driver 106, where the driver 106 adjusts the power provided to the light source 104 based on the setting. In some alternative embodiments, the smart trim 502 may be hardwired or may include a passive component, such as a dip switch, where the smart trim 502 provides a control signal, such as one or more CCT setting signals, that result in the driver 106 providing a power to the light source 104 that results in the light emitted by the light source 104 having a CCT of 2700K.

In some alternative embodiments, the smart trim 504, the smart trim 506, and the smart trim 508 may each be used instead of the smart trim 502 in the lighting fixture 600. For example, the smart trim 502 may be removably attached to the housing 102 or to the base trim 204 (when present), and the smart trim 502 may be replaced by another smart trim to change the CCT of the light provided by the light source 104.

FIG. 7 illustrates a smart trim 700 with voice capability according to an example embodiment. In some example embodiments, the smart trim 700 may correspond to the smart trim 108 of FIG. 1, where the PCB 112 of the smart trim 108 includes the processor 120 configured to process a voice received via one or more microphones, such as the microphone 124. The smart trim 502 may alternatively correspond to the smart trim 202 of FIG. 2, where the PCB 112 of the smart trim 108 includes the processor 120 configured to process a voice received via one or more microphones, such as the microphone 124. For example, the smart trim 700 make start listening to voice commands in response to detecting a wake up word or phrase. The smart trim 700 may process and/or transmit the received voice commands, for example, via a Wi-Fi interface to a remote voice service server (e.g., a cloud server) that may process and send one or more signals back to the smart trim 700 or to another device. Alternatively, the smart trim 700 may control a light source (e.g., the light source 104 of the lighting fixtures 100, 200) based on the voice commands received after detection of the wakeup word or phrase.

In some example embodiments, the smart trim 700 may include other components such as sensors, etc. without departing from the scope of this disclosure. In some alternative embodiments, the smart trim 700 may have a different shape than shown without departing from the scope of this disclosure.

FIG. 8 illustrates a smart trim 800 with an integrated camera according to an example embodiment. In some example embodiments, the smart trim 800 may correspond to the smart trim 108 of FIG. 1, where the PCB 112 of the smart trim 108 includes the sensor 122, which may be a camera. The smart trim 800 may alternatively correspond to the smart trim 202 of FIG. 2, where the PCB 112 of the smart trim 108 includes the sensor 122, which may be a camera. The smart trim 800 may also include a processor, such as the processor 120, that receives, processes, and/or transmits images (e.g., still images or video images). For example, the smart trim 800 may control a light source such as the light source 104 via a driver such as the driver 106 based on the image(s) captured by the integrated camera. Alternatively or in addition, the smart trim 800 may transmit image(s) to a local or remote server for storage and/or processing.

In some example embodiments, the smart trim 800 may include other components such as microphones, speakers, etc. without departing from the scope of this disclosure. In some alternative embodiments, the smart trim 800 may have a different shape than shown without departing from the scope of this disclosure.

FIG. 9 illustrates a smart trim 900 with an integrated projector 906 according to an example embodiment. For example, the smart trim 900 may include the smart trim 108 of FIG. 1 or the smart trim 202 of FIG. 2. In some example embodiments, the smart trim 900 may also include a baffle 902. For example, the smart trim 900 be the smart trim 108 or the smart trim 202 with the baffle 902 attached thereto.

In some example embodiments, one or more components the integrated projector 906 may be positioned in the cavity of the baffle 902. For example, the integrated projector 906 may include a top polarizer layer, a middle LCD layer, and a lower optic layer.

In some example embodiments, the smart trim 900 may also include a speaker 904 and/or other components that are attached to the baffle 902. The smart trim 900 may receive power from a driver, such as the driver 106, in the same manner as described above, for example, with respect to the smart trims 108, 202. In some example embodiments, the projector 906 may project still and video images that are stored in the memory device of the smart trim 908. Alternatively or in addition, the projector 906 may project still and video images that are received wirelessly, for example, by the processor of the smart trim 900. In some alternative embodiments, the smart trim 900 may include other components without departing from the scope of this disclosure. In some alternative embodiments, the smart trim 900 may include fewer components than the smart trims 108, 202 without departing from the scope of this disclosure. In some alternative embodiments, the smart trim 900 may have a different shape than shown without departing from the scope of this disclosure.

FIG. 10 illustrates a lighting fixture 1000 including the smart trim 900 with the integrated projector according to an example embodiment. Referring to FIGS. 1, 2, 9, and 10, the lighting fixture 1000 includes the housing 102, the light source 104, the driver 106, and the smart trim 900. The projector 906 may project an image using the light emitted by the light source 104. For example, the processor 120 of the smart trim 900 may control the driver 106 via the cable 116 in a similar manner as described above to control the light provided by the light source 104 for illumination purposes and for image projection purposes.

In some alternative embodiments, the smart trim 700 and the smart trim 800 may each be used instead of the smart trim 900 in the lighting fixture 1000. For example, the smart trim 900 may be removably attached to the housing 102 or to the base trim 204 (when present), and the smart trim 900 may be replaced by another smart trim to change modularly add different features to the lighting fixture 1000.

Figure 11:
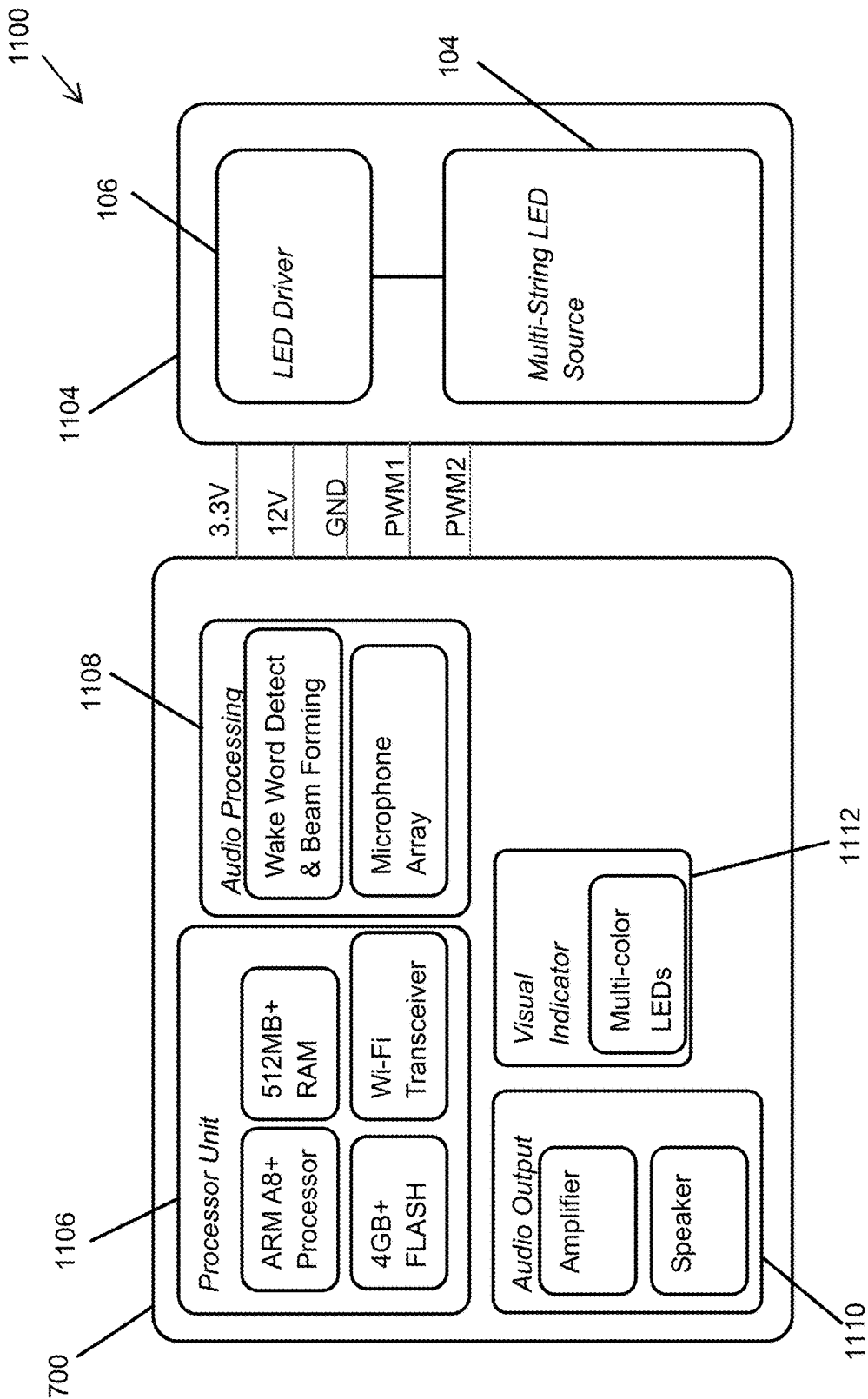
FIG. 11 illustrates a block diagram of a lighting fixture with the smart trim of FIG. 7 according to an example embodiment.

FIG. 11 illustrates a block diagram of a lighting fixture 1100 including the voice-enabled smart trim 700 of FIG. 7 according to an example embodiment. In some example embodiments, the lighting fixture 1100 includes a light engine 1104 that includes the light source 104 and the driver described above. The lighting fixture 1100 also includes the smart trim 700 that may include a processing unit 1106, an audio input unit 1108, an audio output unit 110, and a visual indicator unit 1112. For example, the audio input unit 1108 may process voices received by one or more microphones, for example, to perform beam forming and detect wake word or phrase. In response to determining that a wake word or phrase is received, the audio input unit 1108 may indicate to the processor unit 1106 that the processing unit 1106 should process and/transmit further voice commands, for example, to a cloud voice service server. For example, the processing unit 1106 may transmit the receive voice commands via a Wi-Fi transceiver and may receive information, from the cloud server, for example, via the Wi-Fi transceiver.

In some example embodiments, the smart trim 700 may use the speaker of the audio output unit 1110 to provide audio response to some voice commands received via the microphone array of the smart trim 700. The smart trim 700 may also use one or more visual indicators to indicate status, such whether the processing unit 1106 is awake in response to the detection of a wake word or phrase.

In some example embodiments, the smart trim 700 may control the light source 104 based on voice commands that are received by the smart trim 700 and processed by a cloud voice server or by the processing unit 1106. To illustrate, the driver 106 may receive lighting control signals (e.g., PWM1 and PWM2) from the smart trim 700 and adjust the light emitted by the light source 104. The smart trim 700 may also provide power (e.g., 3.3V and 12V) to the smart trim 700, for example, via one or more wires (e.g., the electrical cable 116 discussed above).

In some example embodiments, the lighting fixture 1100 may include other components without departing from the scope of this disclosure. In some example embodiments, the processing unit 1106 and the audio input unit 1108 may be included in the processor 120 described above.

Figure 12:
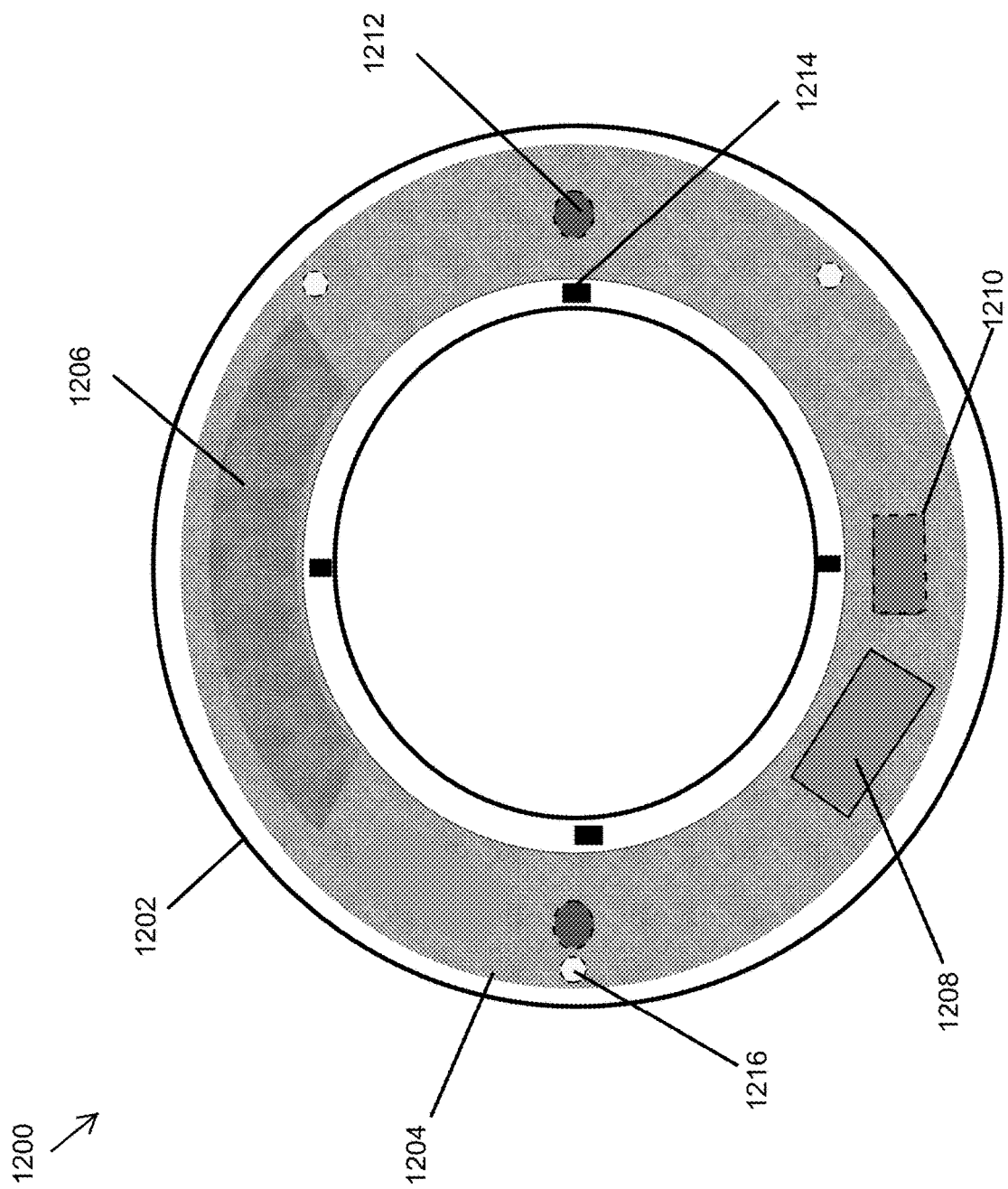
FIG. 12 illustrates a top planar view of a smart trim according to an example embodiment.

FIG. 12 illustrates a top planar view of a smart trim 1200 according to an example embodiment. In some example embodiments, the smart trim 1200 includes a trim structure 1202 and a PCB 1204. The smart trim 1200 may also include a processor 1206, an audio amplifier 1208, a speaker 1210, and one or more microphones 1212. For example, the audio amplifier 1208 and the one or more microphones 1212 may be electrical coupled to the processor 1206 via wire traces of the PCB 1204. For example, the processor 1206 may receive electrical signals from the one or more microphones 1212 and process the signals to determine whether the received voice is a wake word or phrase. The processor 1206 may process and/or transmit other voice commands that are received by the one or more microphones 1212 after determining that a wake word or phrase was received.

In some example embodiments, the processor 1206 may also output audio information, such as response to voice commands, via the speaker 1210 by providing signals to the audio amplifier 1208 that drives the speaker 1210 to output a sound. The processor 1206 may also provide lighting control commands based on received voice commands, for example, after the voice commands are processed by a cloud voice service server.

In some example embodiments, the smart trim 1200 includes one or more indicator lights that can be used to show status, such as the status of the processor 1206 and/or the status of sensors, etc. In some example embodiments, one or more attachment means such as clips 1214 may be used to removably attach the smart trim 1200 to a housing or a base trim of a lighting fixture.

In some example embodiments, the smart trim 1200 may correspond to the smart trim 108, 202, 302-308, 502-508, 700 or 800. In some example embodiments, the smart trim 1200 may include more or fewer components than shown without departing from the scope of this disclosure. In some example embodiments, the speaker 1210 and indicator light sources 1216 may be exposed or viewable through respective openings in the trim structure 1204 to allow the sound from the speaker 1210 and the lights from the indicator light sources 1216 to be heard and seen, respectively, from locations below the smart trim 1200 when the smart trim 1200 along with a recessed lighting fixture is installed in a ceiling. In some alternative embodiments, the smart trim 1200 may include multiple PCBs instead of the PCB 112. In some alternative embodiments, the trim structure 1202 and/or the PCB 1204 may have a different shape than shown without departing from the scope of this disclosure.

FIG. 13 illustrates a lighting fixture 1300 including a smart trim 1302 and a dedicated power module 1304 according to an example embodiment. In some example embodiments, the lighting fixture 1300 includes the housing 102 and the light source 104 described above. The lighting fixture 1300 may also include a driver 1306 that provides power to the light source 104 via an electrical cable 1308 in a similar manner as described above with respect to the driver 106.

In some example embodiments, AC power may be provided to the power module 1304 and the driver 1306. The power module 1304 may provide appropriate power (e.g., one or more DC power signals) to the smart trim 1302 via an electrical cable 1310 in a similar manner as described with respect to the driver 106. The cable 1310 may include multiple electrical wires that can be used to provide power to the smart trim 1302 and for unidirectional or bidirectional communication between the smart trim 1302 and the power module 1304.

In some example embodiments, the smart trim 1302 may provide lighting control signals to the power module 1304 via the cable 1310. For example, the smart trim 1302 may correspond to the smart trim 100, 200, or another one of the smart trims described above. To illustrate, the smart trim 1302 may provide one or more lighting control signals to the power module 1304, and the power module 1304 may provide the received lighting control signals or other signals derived from the received lighting control signals to the driver 1306 via an electrical cable 1312. For example, the power module 1304 may provide dim and/or CCT control signals (e.g., 0-10V signal(s), UART signal(s), etc.) to the driver 1306 that adjusts the power provided to the light source 104 accordingly.

FIG. 14 illustrates a lighting fixture 1400 including a smart trim 1402 and a dedicated power module 1404 according to another example embodiment. In some example embodiments, the lighting fixture 1400 includes the housing 102 and the light source 104 described above. The lighting fixture 1400 may also include a driver 1406 that provides power to the light source 104 via an electrical cable 1408 in a similar manner as described above with respect to the driver 106.

In some example embodiments, AC input power signal may be provided to the power module 1404 that provides a phase-cut power signal derived from the AC input power signal to the driver 1406 via a cable 1412. The power module 1404 may also provide appropriate power (e.g., one or more DC power signals) to the smart trim 1402 via an electrical cable 1310 in a similar manner as described with respect to the driver 106. The cable 1410 may include multiple electrical wires that can be used to provide power to the smart trim 1402 and for unidirectional or bidirectional communication between the smart trim 1402 and the power and communication module 1404.

In some example embodiments, the smart trim 1402 may provide lighting control signals to the power module 1404 via the cable 1410. For example, the smart trim 1402 may correspond to the smart trim 100, 200, or another one of the smart trims described above. To illustrate, the smart trim 1402 may provide one or more lighting control signals to the power module 1404, and the power module 1404 may generate the phase cut power signal based on the lighting control signals and may provide the phase cut power signal to the driver 1406 via an electrical cable 1412. The driver 1306 may adjust the power provided to the light source 104 based on the phase cut power signal. In some example embodiments, the smart trim 1402 may also control whether the power module 1404 provides the phase cut power signal to control whether the light source 104 is powered on or off.

FIG. 15 illustrates a power and communication connection of a smart trim 1502 according to an example embodiment. In some example embodiments, the smart trim 1502 may correspond to one of the smart trims described herein, where the power and communication connection is as shown in FIG. 15. For example, an electrical cable 1504 may be coupled to a driver, such as the driver 106, or to a dedicated power module, such as the power module 1304, 1306. In some example embodiments, the cable 1504 may correspond to the cables 116, 1310, 1410 described above. The cable 1504 may be terminated by a connector 1506 designed to mate with a connector 1510 terminating an electrical cable 1508 that is coupled, for example, to a PCB of the smart trim 1502. For example, the cable 1508 may be soldered to the PCB of the smart trim 1502. The cable 1508 and the connector 1510 may serve as power and/or communication interface of the smart trim 1502. In some example embodiments, the connectors 1506, 1510 may be RJ45 connectors or other types of connectors.

In some example embodiments, the cables 1505 and 1508, which may include multiple electrical wires, may be used to provide power to the smart trim 1502 and for one or two way communication between the smart trim 1502 and a driver or a power module after the connectors 1506 and 1510 are mated. In some example embodiments, the multiple cables and respective connectors may be used instead of the individual cables 1504, 1508 without departing from the scope of this disclosure.

FIG. 16 illustrates a power and communication connection of a smart trim 1602 according to another example embodiment. In some example embodiments, the smart trim 1602 may correspond to one of the smart trims described herein, where the power and communication connection is as shown in FIG. 16. For example, an electrical cable 1604 may be coupled to a driver, such as the driver 106, or to a dedicated power module, such as the power module 1304, 1306. In some example embodiments, the cable 1604 may correspond to the cables 116, 1310, 1410 described above.

In some example embodiments, the cable 1604 may be terminated at magnets 1606 designed to magnetically connect to corresponding magnets 1608 that are electrically coupled to the PCB of the smart trim 1602. The magnets 1608 may be attached to the PCB of the smart trim 1502, for example, by an adhesive while making electrical connection to traces of the PCB. The magnets 1606 and 1608 may connect to each other providing electrical connections between a driver or a power module and the PCB of the smart trim 1602 for power and communications via the cable 1604. The magnets 1606, 1608 may physically secure the smart trim 1602 and the driver or power module. The magnets 1608 may serve as power and/or communication interface of the smart trim 1602.

In some alternative embodiments, more or fewer magnets than shown may be used. In some alternative embodiments, other power delivery and communication connections may be used in addition to the connections shown in FIG. 16.

FIG. 17 illustrates a power and communication connection of a smart trim 1702 according to another example embodiment. In some example embodiments, the smart trim 1702 may correspond to one of the smart trims described herein, where the power and communication connection is as shown in FIG. 17. For example, an electrical cable 1704 may be coupled to a driver, such as the driver 106, or to a dedicated power module, such as the power module 1304, 1306. In some example embodiments, the cable 1704 may correspond to the cables 116, 1310, 1410 described above.

In some example embodiments, the cable 1704 may be terminated at an inductive power transfer and communication module 1706. For example, the inductive power transfer and communication module 1706 may include an inductive coil 1710 and a Near Field Communication (NFC) circuit. Another inductive power transfer and communication module 1708 may also be coupled physically and electrically to the PCB of the smart trim 1702. For example, the inductive power transfer and communication module 1708 may include an inductive coil and an NFC circuit. In some example embodiments, power from a driver or a power module coupled to the cable 1704 may be transferred inductively to the coil of the module 1708 from the coil 1710. The smart trim 702 and the driver or the power module may communicate inductively via the NFC circuit of the module 1708 and the NFC circuit 1712 of the module 1706. The inductive power transfer and communication module 1708 may serve as power and/or communication interface of the smart trim 1702.

In some alternative embodiments, multiple inductive power transfer and communication modules may be used without departing from the scope of this disclosure. In some alternative embodiments, other power delivery and communication connections may be used in addition to the connections shown in FIG. 17.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A trim for a lighting fixture, the trim comprising:
   a trim structure;
   a printed circuit board that is disposed on a back side of the trim structure hidden from view when the lighting fixture is installed, wherein a processor is attached to the printed circuit board, wherein one or more sensors are attached to and positioned on a side of the printed circuit board facing the back side of the trim structure and communicably coupled to the processor, and wherein a front side of the trim structure is at least partially viewable from below the lighting fixture when the lighting fixture is installed; and
   an interface electrically coupled to the processor, wherein a power is provided to the processor from a power source of the lighting fixture via the interface.

2. The trim of claim 1, wherein the interface provides a communication interface for the processor to send one or more electrical signals.

3. The trim of claim 1, wherein the printed circuit board includes a curved perimeter edge to conform to a ring-shape of the trim structure.

4. The trim of claim 1, wherein the one or more sensors are positioned at least partially over one or more holes in the trim structure.

5. The trim of claim 1, further comprising one or more microphones disposed on the trim structure and electrically coupled to the processor.

6. The trim of claim 1, further comprising a transceiver for transmitting and receiving wireless signals in compliance with one or more wireless communication standards.

7. The trim of claim 1, further comprising one or more indicator light sources disposed on the trim structure, wherein the one or more indicator light sources are positioned to emit one or more lights through one or more holes in the trim structure.

8. The trim of claim 1, further comprising a switch that is configurable during manufacturing or installation to indicate to a lighting driver of the lighting fixture a desired correlated color temperature of a light emitted by a light source of the lighting fixture when the trim is attached to the lighting fixture.

9. The trim of claim 1, wherein the printed circuit board is at least partially outside of a housing of the lighting fixture when the trim is attached to the housing.

10. The trim of claim 1, further comprising a baffle extending up from the trim structure on the back side of the trim structure.

11. A lighting fixture, comprising:
    a housing;
    a light source disposed in the housing; and
    a trim detachably attached to the housing, the trim comprising:
      a trim structure;
      a printed circuit board that is disposed on a back side of the trim structure hidden from view when the lighting fixture is installed, wherein a processor is attached to the printed circuit board, wherein one or more sensors are attached to and positioned on a side of the printed circuit board facing the back side of the trim structure and communicably coupled to the processor, and wherein a front side of the trim structure is at least partially viewable from below the lighting fixture when the lighting fixture is installed; and
      an interface electrically coupled to the processor, wherein a power is provided to the processor via the interface.

12. The lighting fixture of claim 11, further comprising a driver that provides the power for the processor and a second power to the light source.

13. The lighting fixture of claim 12, wherein the processor is configured to provide one or more lighting control signals to the driver via the interface to control a light emitted by the light source.

14. The lighting fixture of claim 11, further comprising one or more microphones and a transceiver, wherein the transceiver is configured to transmit and receive wireless signals in compliance with one or more wireless communication standards and wherein the processor is configured to process a voice command received by the one or more microphones to produce a processed voice command and to transmit the processed voice command via the transceiver.

15. The lighting fixture of claim 11, further comprising one or more sensors disposed on the trim structure and communicably coupled to the processor, wherein the one or more sensors are positioned at least partially over one or more holes in the trim structure.

16. The lighting fixture of claim 11, wherein the one or more sensors are mounted on the printed circuit board that is attached to the trim structure on the back side of the trim.

17. The lighting fixture of claim 11, further comprising an integrated projector positioned to project an image using a light emitted by the light source.

18. The lighting fixture of claim 11, further comprising a driver and a power module, wherein the driver is coupled to provide a second power to the light source and the power module is coupled to provide the power to the processor.

19. A lighting fixture, comprising:
    a housing;
    a light source disposed in the housing;
    a base trim attached to the housing; and
    a smart trim detachably attached to the base trim and covering the base trim from below the lighting fixture, the smart trim comprising:
      a trim structure;

a printed circuit board that is disposed on a back side of the trim structure hidden from view when the lighting fixture is installed, wherein a processor is attached to the printed circuit board, wherein one or more sensors are attached to and positioned on a side of the printed circuit board facing the back side of the trim structure and communicably coupled to the processor, and wherein a front side of the trim structure is at least partially viewable from below the lighting fixture when the lighting fixture is installed; and an interface electrically coupled to the processor, wherein a power is provided to the processor via the interface.

20. The lighting fixture of claim 19, further comprising a driver that provides the power for the processor and a second power to the light source.

* * * * *